US012675844B2

(12) United States Patent
Yu et al.

(10) Patent No.: US 12,675,844 B2
(45) Date of Patent: Jul. 7, 2026

(54) METHOD FOR HIGH-RESOLUTION IMAGE RECONSTRUCTION

(71) Applicant: SHANGHAITECH UNIVERSITY, Shanghai (CN)

(72) Inventors: Jingyi Yu, Shanghai (CN); Yuyao Zhang, Shanghai (CN); Lan Xu, Shanghai (CN); Yuwei Li, Shanghai (CN); Qing Wu, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 289 days.

(21) Appl. No.: 18/568,316

(22) PCT Filed: Jul. 12, 2021

(86) PCT No.: PCT/CN2021/105862
§ 371 (c)(1),
(2) Date: Dec. 8, 2023

(87) PCT Pub. No.: WO2023/283795
PCT Pub. Date: Jan. 19, 2023

(65) Prior Publication Data
US 2024/0273672 A1 Aug. 15, 2024

(51) Int. Cl.
*G06T 3/4046* (2024.01)
*G06T 3/4053* (2024.01)
(Continued)

(52) U.S. Cl.
CPC .......... *G06T 3/4046* (2013.01); *G06T 3/4053* (2013.01); *G06T 5/10* (2013.01);
(Continued)

(58) Field of Classification Search
CPC ....... G06T 3/4046; G06T 5/60; G06T 3/4053; G06T 5/10; G06T 5/50; G06T 9/002;
(Continued)

(56) References Cited

U.S. PATENT DOCUMENTS

2007/0086678 A1* 4/2007 Chefd'hotel .............. G06T 5/50
382/128
2013/0102877 A1* 4/2013 Mori ......................... G06T 7/11
382/128
(Continued)

FOREIGN PATENT DOCUMENTS

CN 102592137 A 7/2012
CN 110464353 A 11/2019
(Continued)

OTHER PUBLICATIONS

Ebner, M., et al.: An automated framework for localization, segmentation and super-resolution reconstruction of fetal brain MRI. NeuroImage 206, 116324 (2019). https://doi.org/10.1016/j.neuroimage.2019.116324 (Year: 2019).*
(Continued)

*Primary Examiner* — Utpal D Shah
*Assistant Examiner* — Jack Peter Kraynak
(74) *Attorney, Agent, or Firm* — Bayramoglu Law Offices LLC

(57) ABSTRACT

Described herein are methods and non-transitory computer-readable media configured to obtain a plurality of images from a plurality of image scanning orientations for an object. A rigid registration is performed to the plurality of images to obtain a transformation matrix to normalize the plurality of images from their respective image spaces to a normalized image space. Each normalized image comprises a plurality of voxels. A machine learning model comprising an implicit representation of a high-resolution image is trained using the normalized images, wherein the high-resolution image comprises more voxels than the voxels in the normalized images. The high-resolution image is generated based on the trained machine learning model. The plurality of images are a
(Continued)

plurality of anisotropic 2D images, while the high resolution image can be a 2D or 3D high resolution image.

18 Claims, 9 Drawing Sheets

(51) Int. Cl.

| | |
|---|---|
| *G06T 5/10* | (2006.01) |
| *G06T 5/50* | (2006.01) |
| *G06T 5/60* | (2024.01) |
| *G06T 9/00* | (2006.01) |
| *G06T 15/08* | (2011.01) |
| *G06T 19/20* | (2011.01) |

(52) U.S. Cl.
CPC .................. *G06T 5/50* (2013.01); *G06T 5/60* (2024.01); *G06T 9/002* (2013.01); *G06T 15/08* (2013.01); *G06T 19/20* (2013.01); *G06T 2207/10061* (2013.01); *G06T 2207/10081* (2013.01); *G06T 2207/10088* (2013.01); *G06T 2207/20048* (2013.01); *G06T 2207/20081* (2013.01); *G06T 2207/20084* (2013.01); *G06T 2207/30016* (2013.01); *G06T 2210/21* (2013.01); *G06T 2210/41* (2013.01); *G06T 2219/2016* (2013.01)

(58) Field of Classification Search
CPC ..................... G06T 15/08; G06T 19/20; G06T 2207/20048; G06T 2207/20081; G06T 2207/20084; G06T 2219/2016
See application file for complete search history.

(56) References Cited

U.S. PATENT DOCUMENTS

| | | | | |
|---|---|---|---|---|
| 2018/0005361 | A1* | 1/2018 | Bulyshev | ............. G06T 11/006 |
| 2020/0072931 | A1 | 3/2020 | Zaiss et al. | |
| 2021/0125331 | A1* | 4/2021 | Sun | ...................... G06N 3/0464 |
| 2022/0301252 | A1* | 9/2022 | Wang | ................... G06T 15/506 |

FOREIGN PATENT DOCUMENTS

| | | | |
|---|---|---|---|
| CN | 111353935 | A | 6/2020 |
| CN | 112102385 | A | 12/2020 |

OTHER PUBLICATIONS

Tancik, M., et al.: Fourier features let networks learn high frequency functions in low dimensional domains. arXiv preprint arXiv:2006. 10739 (2020) (Year: 2020).*

Feng, C. M., Wang, K., Lu, S., Xu, Y., Kong, H., & Shao, L. (2019). Coupled-projection residual network for mri super-resolution. arXiv preprint arXiv:1907.05598. (Year: 2019).*

Gholipour, A., Estroff, J., Warfield, S.: Robust super-resolution vol. reconstruction from slice acquisitions: application to fetal brain MRI. IEEE Trans. Med. Imag. 29, 1739-58 (2010). (Year: 2010).*

Jia, Y., He, Z., Gholipour, A., Warfield, S.: Single anisotropic 3-d MR image upsampling via overcomplete dictionary trained from in-plane high resolution slices. IEEE J. Biomed. Health Inform. 20 (2015). (Year: 2015).*

Ur Rahman, S., Wesarg, S.: Combining short-axis and long-axis cardiac MR images by applying a super-resolution reconstruction algorithm. Fraunhofer IGD 7623, Mar. 2010. (Year: 2010).*

Zhang, H., Wang, R., Zhang, J., Li, C., Yang, G., Spincemaille, P., . . . & Wang, Y. (2021). Nerd: Neural representation of distribution for medical image segmentation. arXiv preprint arXiv:2103. 04020. (Year: 2021).*

* cited by examiner

100
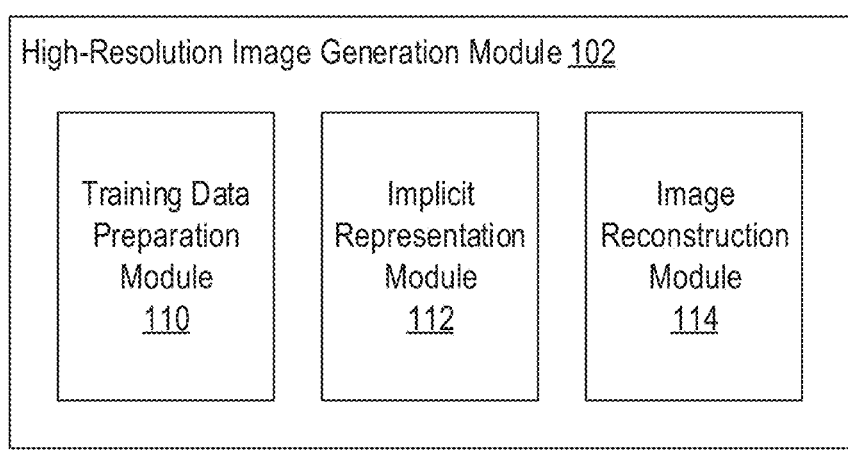
High-Resolution Image Generation Module 102
| Training Data Preparation Module 110 | Implicit Representation Module 112 | Image Reconstruction Module 114 |
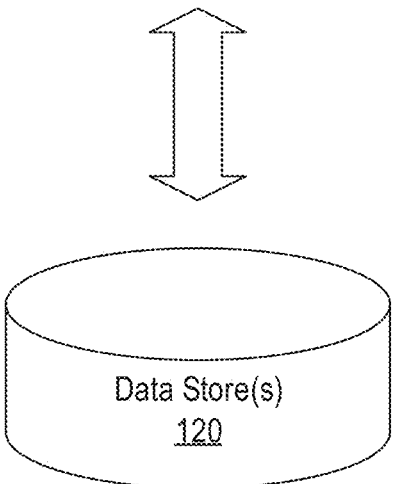
Data Store(s)
120
FIG. 1

300

| Dataset Name | # Image | Number of Slices | Matrix Size | Spacing($mm^3$) | Scan Time |
|---|---|---|---|---|---|
| #A | sub1-sub5 | 244 | 244×244 | 0.8×0.8×0.8 | - |
| #B | sub1-sub2 | 64 | 256×256 | 1×1×2 | - |
| #C | HR reference | 254 | 368×345 | 0.7×0.7×0.7 | 30.9 mins |
| | axial scan | 80 | 320×320 | 0.7×0.7×2.8 | 10.3 mins |
| | coronal scan | 80 | 320×320 | 0.7×2.8×0.7 | 10.3 mins |
| | sagittal scan | 64 | 320×320 | 2.8×0.7×0.7 | 8.2 mins |

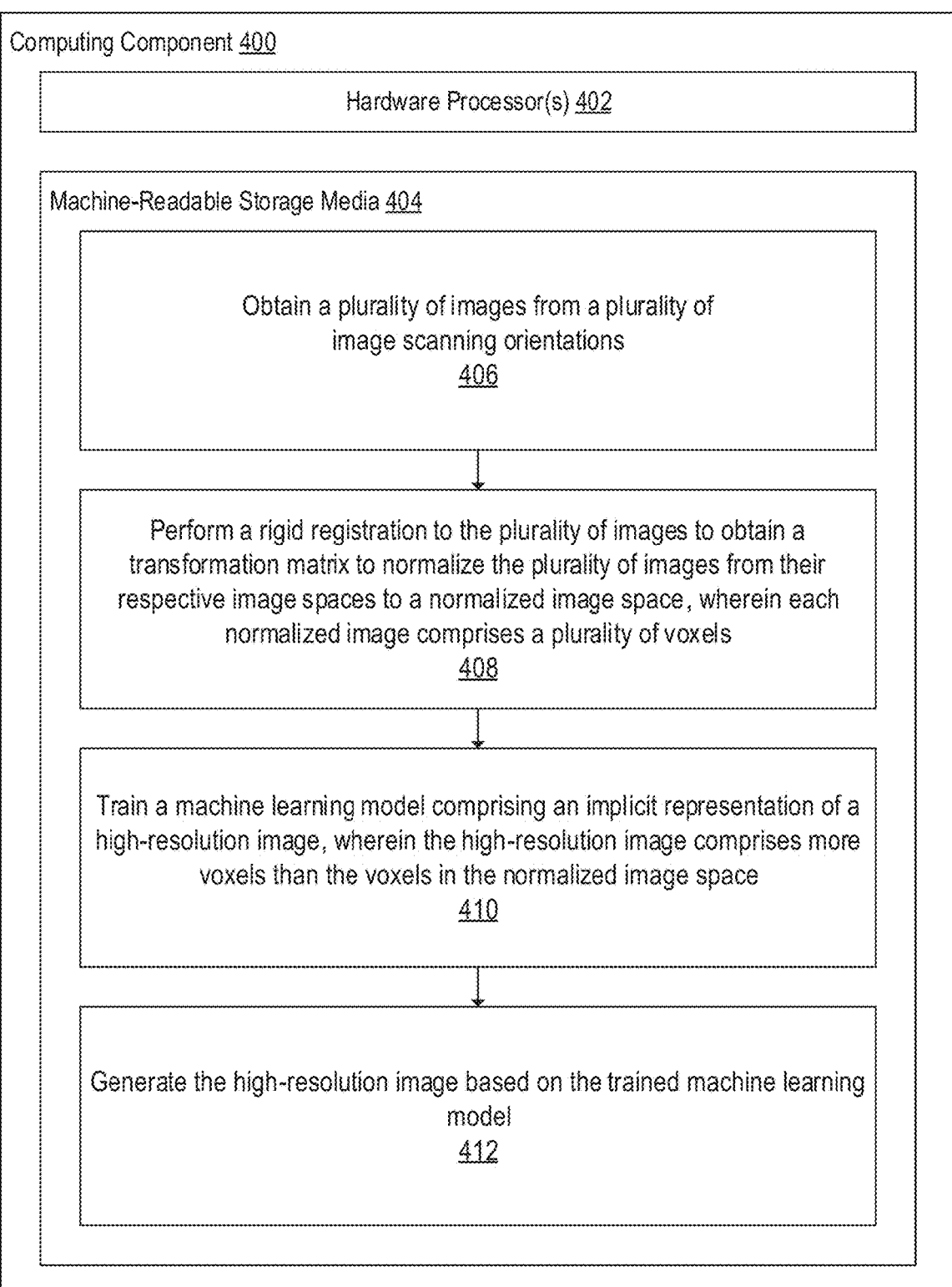

Computing Component 400

Hardware Processor(s) 402

Machine-Readable Storage Media 404

Obtain a plurality of images from a plurality of
image scanning orientations
406

Perform a rigid registration to the plurality of images to obtain a
transformation matrix to normalize the plurality of images from their
respective image spaces to a normalized image space, wherein each
normalized image comprises a plurality of voxels
408

Train a machine learning model comprising an implicit representation of a
high-resolution image, wherein the high-resolution image comprises more
voxels than the voxels in the normalized image space
410

Generate the high-resolution image based on the trained machine learning
model
412

METHOD FOR HIGH-RESOLUTION IMAGE RECONSTRUCTION

CROSS REFERENCE TO THE RELATED APPLICATIONS

This application is the national stage entry of International Application No. PCT/CN2021/105862, filed on Jul. 12, 2021, the entire contents of which are incorporated herein by reference.

TECHNICAL FIELD

The present invention generally relates to image processing, and more particularly, the reconstruction of high-resolution magnetic resonance images (MRIs) using a neural network.

BACKGROUND

High-resolution images, such as high-resolution magnetic resonance images (MRIs), can provide structural details of organs to facilitate various medical diagnoses. However, oftentimes, these high-resolution images can be unclear (i.e., fuzzy, blurry, etc.) due to unpredictable patient movements. For example, a patient may experience voluntary or involuntary movements while being imaged by a magnetic resonance (MR) scanner. Over the years, several techniques have been developed to address the problems described above. For example, multiple image super-resolution (MISR) techniques and single image super-resolution (SISR) techniques have been developed to improve spatial resolution of reconstructed images. In the MISR techniques, multiple low-resolution images of an object are used to volumetrically render a high-resolution image of the object. However, high-resolution images reconstructed using the MISR technique are insufficient to resolve submillimeter-level details, such as resolving details of cerebellum of a brain. In the SISR techniques, a convolution neural network (CNN) is used to transform low-resolution images into high-resolution images. However, training a CNN to transform low-resolution images into high-resolution images requires a large dataset of high-resolution images. As such, the SISR technique may not practically be used for image transformation when high-resolution images with which to train a CNN are lacking, such as using SISR techniques to construct a fetus brain. Better solutions are needed.

The above information disclosed in this Background section is only for facilitating the understanding of the background of this invention, and may contain information that is not known to a person of ordinary skill in the art.

SUMMARY

One aspect of the present invention is directed to a computer-implemented method to obtain a plurality of images from a plurality of image scanning orientations for an object. A rigid registration can be performed to the plurality of images to obtain a transformation matrix to normalize the plurality of images from their respective image spaces to a normalized image space. Each normalized image comprises a plurality of voxels. A machine learning model comprising an implicit representation of a high-resolution image is trained using the normalized images, wherein the high-resolution image comprises more voxels than the voxels in the normalized images. The high-resolution image can be generated based on the trained machine learning model.

In some embodiments, Fourier feature mapping can be performed by mapping positional coordinates of the voxels to a higher dimensional space.

In some embodiments, the plurality of images can be arranged in image slices in orthogonal orientations. The orthogonal orientations can include at least one of a coronal orientation, an axial orientation, or a sagittal orientation.

In some embodiments, the plurality of images can be a plurality of anisotropic 2D images. The high-resolution image can be a 2D high-resolution image.

In some embodiments, the plurality of images can be a plurality of anisotropic 2D images. The high-resolution image can be a 3D high-resolution image.

In some embodiments, the machine learning model can be optimized by minimizing errors between intensity values outputted by the machine learning model and intensity values of the normalized plurality of images.

In some embodiments, a dense grid of the normalized image space can be generated. The dense grid can be represented by voxels and each voxel can be represented by a positional coordinate in the normalized image space. Positional coordinates of voxels of the high-resolution image can be inputted into the machine learning model. Intensity values can be received from the machine learning model based on the positional coordinates of voxels of the high-resolution image. The high-resolution image can be generated based on the intensity values.

In some embodiments, each images can be selected from a group consisting of a magnetic resonance image, a computed tomography scan image, an optical image, and an electron scanning microscope image.

In some embodiments, the machine learning model can be a fully connected multi-layer perceptron (MLP) network.

In some embodiments, the fully connected MLP network can comprise eighteen fully-connected layers. First, seventh, and thirteenth layers of the fully-connected MLP network can have a number of neurons that is different from other layers of the fully-connected MLP network. The other layers of the fully-connected MLP network can have at least 256 neurons per layer.

Another aspect of the present invention is directed to a non-transitory storage medium of a computing system storing instructions that, when executed by one or more processors of the computing system, can cause the computing system to perform a method to obtain a plurality of images from a plurality of image scanning orientations for an object. A rigid registration can be performed to the plurality of images to obtain a transformation matrix to normalize the plurality of images from their respective image spaces to a normalized image space. Each normalized image comprises a plurality of voxels. A machine learning model comprising an implicit representation of a high-resolution image is trained using the normalized images, wherein the high-resolution image comprises more voxels than the voxels in the normalized images. The high-resolution image can be generated based on the trained machine learning model.

In some embodiments, Fourier feature mapping can be performed by mapping positional coordinates of the voxels to a higher dimensional space.

In some embodiments, the plurality of images can be arranged in image slices in orthogonal orientations. The orthogonal orientations can include at least one of a coronal orientation, an axial orientation, or a sagittal orientation.

In some embodiments, the plurality of images can be a plurality of anisotropic 2D images. The high-resolution image can be a 2D high-resolution image.

In some embodiments, the plurality of images can be a plurality of anisotropic 2D images. The high-resolution image can be a 3D high-resolution image.

In some embodiments, the machine learning model can be optimized by minimizing errors between intensity values outputted by the machine learning model and intensity values of the normalized plurality of images.

In some embodiments, a dense grid of the normalized image space can be generated. The dense grid can be represented by voxels and each voxel can be represented by a positional coordinate in the normalized image space. Positional coordinates of voxels of the high-resolution image can be inputted into the machine learning model. Intensity values can be received from the machine learning model based on the positional coordinates of voxels of the high-resolution image. The high-resolution image can be generated based on the intensity values.

In some embodiments, each images can be selected from a group consisting of a magnetic resonance image, a computed tomography scan image, an optical image, and an electron scanning microscope image.

In some embodiments, the machine learning model can be a fully connected multi-layer perceptron (MLP) network.

In some embodiments, the fully connected MLP network can comprise eighteen fully-connected layers. First, seventh, and thirteenth layers of the fully-connected MLP network can have a number of neurons that is different from other layers of the fully-connected MLP network. The other layers of the fully-connected MLP network can have at least 256 neurons per layer.

These and other features of the apparatuses, systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 1 illustrates an example system, including a high-resolution image generation module, according to various embodiments of the present disclosure.

FIG. 3A illustrates a table showing details of magnetic resonance scans used to evaluate performance of a machine learning model, according to various embodiments of the present disclosure.

FIG. 4 illustrates a computing component that includes one or more hardware processors and a machine-readable storage media storing a set of machine-readable/machine-executable instructions that, when executed, cause the hardware processor(s) to perform a method, according to various embodiments of the present disclosure.

Figure 2A:
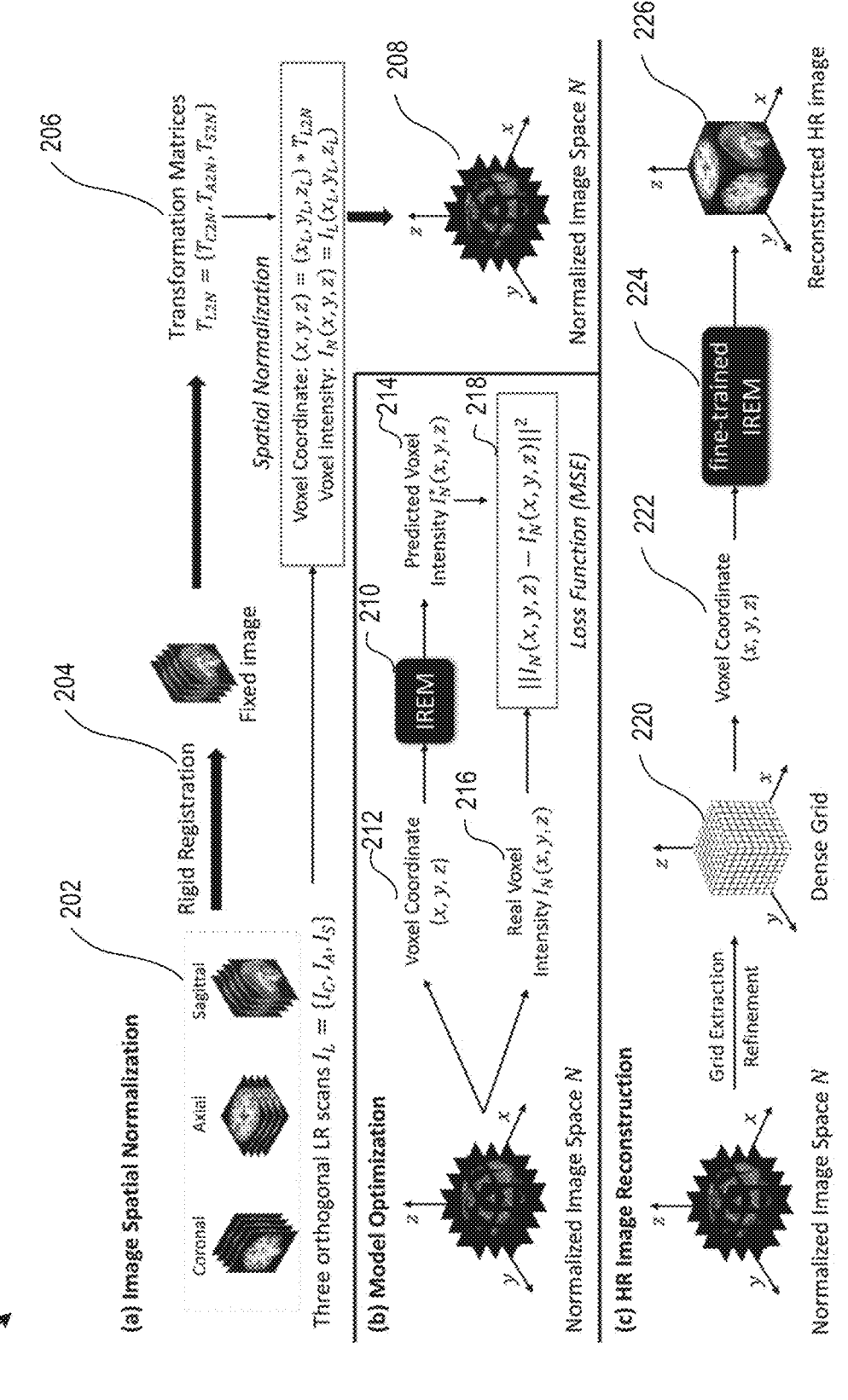
FIG. 2A illustrates an approach of using a high-resolution image generation module to reconstruct high-resolution images, according to various embodiments of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION OF THE EMBODIMENTS

Described herein is a solution that addresses the problems described above. In various embodiments, a machine learning model comprising an implicit representation of a high-resolution image, or an implicit representation module, can be trained to reconstruct high-resolution images of an object. In general, any machine learning technique can be used to implement the machine learning model. For example, in some embodiments, the machine learning model can be implemented using a fully-connected multi-layer perceptron. The machine learning model can be trained using a dataset comprising a plurality of low-resolution images depicting an object. The plurality of low-resolution images can depict the object from multiple perspectives, vantage points, or image scanning orientations. In some embodiments, low-resolution MR images of the object can be used to train the machine learning model. In general, any type of low-resolution images can be used to train the implicit representation module. For example, in some embodiments, low-resolution computed tomography (CT) scan images can be used to train the machine learning model. As another example, in some embodiments, low-resolution electron scanning microscope images can be used to train the machine learning model. Once trained, the machine learning model can reconstruct a high resolution image of the object. Through the trained machine learning model, a high-resolution image of the object can be generated from any perspective based on positional coordinates (e.g., three-dimensional positional coordinates) of voxels corresponding to that perspective. The machine learning model can take the positional coordinates as inputs and output intensity values of voxels corresponding to the positional coordinates. For example, three-dimensional positional coordinates of a high-resolution image to be reconstructed can be inputted into the trained machine learning model. In response, the trained machine learning model can output intensity values of voxels corresponding to the three-dimensional positional coordinates. Based on the intensity values, the high-resolution image can be constructed. The solution described herein provides several technical advantages over conventional techniques of reconstructing high-resolution images. For example, unlike the SISR technique, the solution provided herein does not need a large dataset of high-resolution images to train a machine learning model to render high-resolution images. Furthermore, the solution provided herein can provide arbitrary up-sampling of image resolution. Moreover, high-resolution images generated using the solution provided herein can provide superior image quality with high signal-to-noise ratio performance. These and other features of the machine learning model are discussed herein.

FIG. 1 illustrates an example system 100, including a high-resolution image generation module 102, according to various embodiments of the present disclosure. In various embodiments, the high-resolution image generation module 102 can be configured to generate (e.g., volumetrically render) high-resolution images of an object in an environment based on a machine learning model. The machine learning model can be trained to output intensity values of voxels of the environment based on a set of positional coordinates. In general, in computer vision or computer graphics, voxels are elements (e.g., units) of volume that constitute a three-dimensional space. Each voxel in the three-dimensional space can be denoted by a three-dimensional coordinate system (e.g., a Cartesian coordinate). For example, an intensity value of a voxel in a volume can be represented by $I(x, y, z)$. In this example, I denotes the intensity value and coordinates $(x, y, z)$ denote a positional coordinate of the voxel in the volume. In general, a voxel in a three-dimensional space can be thought of as being equivalent to a pixel in a two-dimensional image space. During training, the machine learning model can encode the intensity values of the voxels of the environment and positional coordinates of the voxels into the machine learning model. Once trained (i.e., encoded), the machine learning model can construct a high-resolution image of the object. For example, based on a positional coordinate, $(x_1, y_1, z_1)$, the machine learning model can output an intensity value at that positional coordinate, $I(x_1, y_1, z_1)$. These intensity values can be used to generate high-resolution images. Although the machine learning model is described in the context of encoding intensity values of voxels into the implicit representation model, in various embodiments, the machine learning model can also be trained to encode other information into the machine learning model. For example, in some embodiments, the machine learning model can be trained to encode color values of voxels, in addition to or in lieu of intensity values. For example, during training of a machine learning model, a color value of a voxel in a volume, $C(x, y, z)$, can be encoded into the machine learning model along with its corresponding intensity value, $I(x, y, z)$ and positional coordinates. In this example, the machine learning model can output both color values and intensity values of voxels based on positional coordinates. In some embodiments, as shown in FIG. 1, the high-resolution image generation module 102 can include a training data preparation module 110, an implicit representation module 112, and an image reconstruction module 114. The training data preparation module 110, the implicit representation module 112, and the image reconstruction module 114 will be discussed in greater detail herein.

The training data preparation module 110 can be configured to generate a training dataset with which to train a machine learning model to generate (e.g., volumetrically render) high-resolution images of an object in an environment in various unseen perspectives. In some embodiments, the training data preparation module 110 can be configured to receive a plurality of low-resolution images depicting the object in the environment in various orthogonal orientations. For example, a machine learning model can be trained to generate high-resolution images (e.g., MR images) of a brain. In this example, to prepare a training dataset with which to train the machine learning model to encode intensity information associated with the brain into an implicit representation, the training data preparation module 110 can receive (or be inputted with) low-resolution images (e.g., MR images) of the brain in various orthogonal orientations (e.g., coronal, axial, and sagittal orientations). In some embodiments, the plurality of low-resolution images can be provided to the training data preparation module 110 as an image stack along each orthogonal orientation. For example, continuing from the example above, the low-resolution images of the brain can be provided to the training data preparation module 110 in three image stacks, with each image stack representing MR image slices (e.g., image planes) of the brain along each orthogonal orientation. For example, the training data preparation module 110 can be provided with a first set of low-resolution MR images representing slices of the brain along a coronal orientation, a second set of low-resolution MR images representing slices of the brain along an axial orientation, and a third set of low-resolution MR images representing slices of the brain along a sagittal orientation.

In some embodiments, the training data preparation module 110 can perform a rigid registration on the plurality of low-resolution images to generate a transformation matrix. The transformation matrix can be used to transform the plurality of low-resolution images from their original image spaces to a normalized image space. In general, a rigid registration is a geometric transformation in a three-dimensional space in which distances between voxels are preserved. The training data preparation module 110, based on the transformation matrix, can transform each of the plurality of low-resolution images into the normalized image space. In the normalized image space, intensity values of low-resolution images from different image stacks (e.g., coronal, axial, and sagittal) that have same coordinates in the normalized image space can represent coherent observations of the object (i.e., explicit representations) in different orientations. For example, low-resolution image stacks of a brain in coronal, axial, and sagittal orientations can be transformed, based on a transformation matrix, from their respective image spaces to a normalized three-dimensional space. In this example, different intensity values from different low-resolution image stacks that are at same coordinates in the normalized three-dimensional space can represent coherent observations of the brain in different image scanning orientations. Coherent observations can be important in determining true intensity values of an object depicted (or reflected) in a set of images.

In some embodiments, the transformation matrix can be represented as follows:

$$T_{L2N} = \{T_{C2N}, T_{A2N}, T_{S2N}\}$$

where $T_{L2N}$ is the transformation matrix that transforms images from their local image space to a normalized space. $T_{C2N}$ is a transformation matrix that transforms images from an image stack in a coronal orientation to the normalized space. $T_{A2N}$ is a transformation matrix that transforms images from an image stack in an axial orientation to the normalized space. $T_{S2N}$ is a transformation matrix that transforms images from an image stack in a sagittal orientation to the normalized space. As such, different transformation matrices are used to transforms images based on image stack orientations of the images. In some embodiments, positional coordinates of voxels in the normalized space can be represented as follows:

$$N(x, y, z) = (x_L, y_L, z_L) * T_{L2N}$$

where $N(x, y, z)$ is the positional coordinate of voxels in the normalized space, $(x_L, y_L, z_L)$ is a positional coordinate of a voxel (e.g., pixels) in its local image space, and $T_{L2N}$ is the transformation matrix.

The implicit representation module 112 can be configured to train the machine learning model based on the training dataset generated by the training data preparation module 110. The machine learning model can be trained to output an image function, such as intensity values I(x, y, z), based on positional coordinates, (x, y, z), of voxels. During training, the normalized plurality of low-resolution images, positional coordinates of voxels, and intensity values of voxels are inputted into the machine learning model. The machine learning model is trained to output intensity values, I(x, y, z), at positional coordinates of voxels. The machine learning model is trained to minimize errors when between intensity values outputted by the machine learning model and intensity values of the normalized plurality of low-resolution images (i.e., minimizing differences in intensity values). In some embodiments, during training, the machine learning model can be up-sampled with arbitrary positional coordinates (x, y, z) using a Fourier feature mapping to enable the machine learning model to learn high-frequency image features from the normalized plurality of low-resolution images. The Fourier feature mapping is a technique in which positional coordinates of voxels are transformed from a three-dimensional space to a higher dimensional space (i.e., $R^{2L}(2L>3)$). In some embodiments, 2L can be set to 256 (or 256 dimensions). The positional coordinates of voxels in the higher dimensional space are then inputted into the machine learning model for training. In some embodiments, the Fourier feature mapping can be represented as follows:

$$\gamma(P) = [\cos(2\pi BP), \sin(2\pi BP)]^T$$

where $P=(x, y, z) \in R^3$ and each element in $B \in R^{L \times 3}$ is sampled from a Gaussian distribution $N(0, 1)$. In this way, images generated by the machine learning model can be high-resolution images. In various embodiments, the machine learning model can be implemented using a fully-connected multi-layer perceptron (MLP). In general, the machine learning model can be implemented any suitable machine learning technique. In a particular implementation, the machine learning model can be implemented as a fully-connected MLP comprising eighteen fully-connected layers. Each of the fully-connected layers can be followed by a batch normalization layer and a rectified linear unit (ReLU) activation. To ease the difficulty of optimizing the implicit representation model, two connections that concatenate an input of the fully-connected network are skipped at the sixth layer's activation and the twelfth layer's activation, respectively. In this implementation, first, seventh, and thirteenth fully-connected layers have 2L, 2L+256, 2L+256 neurons, respectively. In some embodiments, 2L can to set to 256 (or 256 neurons). Other fully-connected layers have all 256 neurons. The fully-connected MLP will be discussed in further detail with reference to FIG. 2B herein.

In some embodiments, the machine learning model can be trained using an optimizer through back-propagation with a mini-batch size of 2500 MR images. In some embodiments, parameters of the optimizer can be as follow: $\beta_1=0.9$, $\beta_2=0.999$, $\varepsilon=10^{-8}$. In such embodiments, a learning rate for the machine learning model can start from $10^{-4}$ and decay by a factor of 0.5 every 500 epochs (or passes of training data).

In some embodiments, the implicit representation module 112 can be configured to optimize the machine learning model. In some embodiments, the implicit representation module 112 can optimize the machine learning model by minimizing a mean square error loss function between intensity values of voxels outputted by the machine learning model and observed intensity values of voxels across the plurality of normalized low-resolution images. In some embodiments, the mean square error loss function can be represented as follows:

$$L(\theta) = \frac{1}{\mathcal{K}} \sum_{(x,y,z)\in N} \|I_N(x, y, z) - I_N^*(x, y, z)\|^2$$

where L is the mean square error loss function, K is a mini-batch size, N is a normalized image space, and $\theta$ is a machine learning model parameter, $I_N$ is an intensity value of a voxel outputted by the implicit representation model, and $I_N^*$ is an observed intensity value of the voxel across a low-resolution image (e.g., training dataset). In this way, the machine learning model can be fine-tuned to generate high-resolution images that quantitatively and qualitatively outperform images generated using various MISR methods.

The image reconstruction module 114 can be configured to generate (e.g., volumetrically render, reconstruct, etc.) high-resolution images based on the machine learning model. In some embodiments, the image reconstruction module 114 can generate a dense grid corresponding to the normalized image space of the training dataset. Each voxel of the dense grid can have a positional coordinate (x, y, z). When generating a high-resolution image, positional coordinates of voxels corresponding to the high-resolution image can be inputted into the machine learning model to generate corresponding intensity values at the positional coordinates. For example, a high-resolution image to be reconstructed from the normalized image space can have positional coordinates of $(x_1, y_1, z_1)$, $(x_2, y_2, z_2)$, $(x_3, y_3, z_3)$, $(x_4, y_4, z_4)$, so on, in the normalized image space In this example, intensity values of voxels at these positional coordinates, $I(x_1, y_1, z_1)$, $I(x_2, y_2, z_2)$, $I(x_3, y_3, z_3)$, $I(x_4, y_4, z_4)$, so on, can be obtained from the machine learning model. These intensity values can be used to construct the high-resolution image. The image reconstruction module 114 will be discussed in further detail with reference to FIG. 2A herein.

In some embodiments, as shown in FIG. 1, the system 100 can further include at least one data store 120. The high-resolution image generation module 102 can be configured to communicate and/or operate with the at least one data store 120. The at least one data store 120 can store various types of data associated with the high-resolution image generation module 102. For example, the at least one data store 120 can store a training dataset with which to train a machine learning model for image reconstruction. The training dataset can include, for example, images, videos, and/or looping videos depicting objects. For instance, the at least one data store 120 can store a plurality of images of a brain in image stacks.

FIG. 2A illustrates an approach of using a high-resolution image generation module 200 to reconstruct high-resolution images, according to various embodiments of the present disclosure. In some embodiments, the high-resolution image generation module 200 of FIG. 2A can be implemented as the high-resolution image generation module 102 of FIG. 1. As shown in FIG. 2A, in some embodiments, a training dataset with which to train a machine learning model 210 (i.e., IREM or Implicit Representation for MRI) associated with the high-resolution image generation module 200 can be received. The training dataset can include a plurality of low-resolution MR images 202. The plurality of low-resolution MR images 202 can be provided in orthogonal image stacks. For example, as shown in FIG. 2A, the plurality of low-resolution MR images 202 (i.e., $I_L$) can be provided in an image stack in a coronal orientation (i.e., $I_C$), an image stack in an axial orientation (i.e., $I_A$), and an image stack in a sagittal orientation (i.e., $I_S$). Once the plurality of low-resolution MR images is received, a rigid transformation 204 can be performed on the plurality of low-resolution MR images to generate a transformation matrix 206 with which to transform the plurality of low-resolution MR images from their original image spaces into a normalized three-dimensional image space 208. The transformation matrix 206 can comprise three distinct transformation matrices, one matrix for each image stack. For example, as shown in FIG. 2A, a transformation matrix, $T_{C2N}$, can transform images in the image stack in the coronal orientation into the normalized three-dimensional image space 208. A transformation matrix, $T_{A2N}$, can transform images in the image stack in the axial orientation into the normalized three-dimensional image space 208. A transformation matrix, $T_{S2N}$, can transform images in the image stack in the sagittal orientation into the normalized three-dimensional image space 208. Once the plurality of low-resolution MR images is normalized, these images can then be used to train the machine learning model 210. The training of the machine learning model 210 will be discussed in further detail with reference to FIG. 2B herein.

After the machine learning model 210 is trained, the machine learning model 210 can be optimized. During optimization, positional coordinates of voxels 212 in the normalized plurality of low-resolution MR images are inputted into the machine learning model 210 to output predicted intensity values 214 at the positional coordinates of the voxels. The predicted intensity values 214 are then compared with intensity values 216 of the positional coordinates of the voxels in the normalized plurality of low-resolution MR images to minimize a mean square error loss function

218. After the machine learning model 210 is optimized, the machine learning model can be used to generate high-resolution images.

The high-resolution image generation module 200 can generate a dense grid 220 based on the normalized three-dimensional image space 208. The dense grid 220 can include positional coordinates of voxels in the dense grid 220 and, in some cases, can include voxels that are not present in the normalized plurality of low-resolution MR images. Positional coordinates of voxels 222 of a high-resolution image 226 to be reconstructed can be inputted into the optimized machine learning model 224 to output intensity values at the positional coordinates of voxels 222. Based on these intensity values, the high-resolution image 226 can be reconstructed by the high-resolution image generation module 200. In general, the high-resolution image 226 reconstructed by the high-resolution image generation module 200 has a higher number of pixels (or voxels) than a number of pixels in the plurality of low-resolution MR images 202.

Figure 2B:
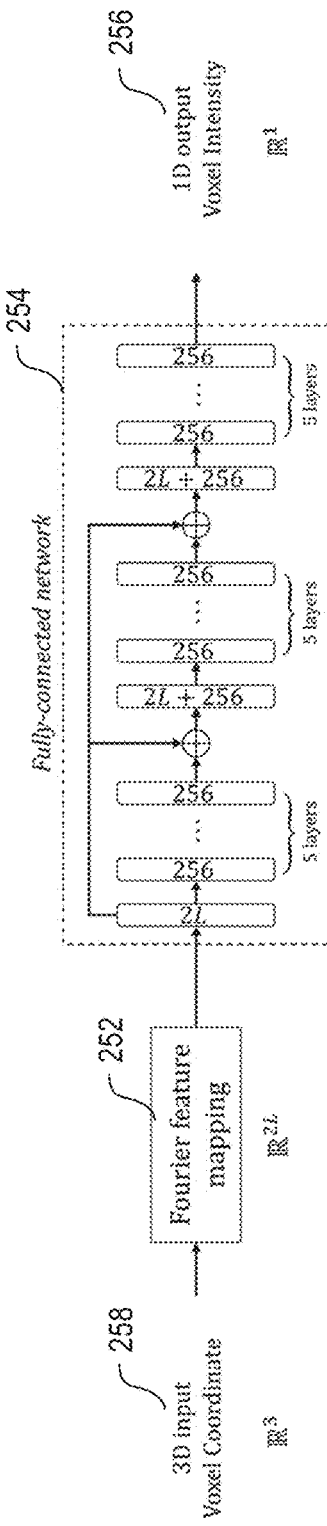
FIG. 2B illustrates an optimization process of a machine learning model comprising an implicit representation of a high-resolution image, or an implicit representation module, according to various embodiments of the present disclosure.

FIG. 2B illustrates a machine learning model 250 associated with implicit representation module, according to various embodiments of the present disclosure. In some embodiments, the machine learning model 250 of FIG. 2B can be implemented with the machine learning model 210 of FIG. 2A or the machine learning model of FIG. 1. As shown in FIG. 2B, the machine learning model 250 can include a Fourier feature mapping module 252 and a fully-connected multi-layer perceptron (MLP) network 254. The Fourier feature mapping module 252 can be configured to map positional coordinates of voxels from three dimensions to a higher dimensional space (i.e., from $R^3$ to $R^{2L}$). This up-sampling of input data allows the fully-connected MLP network 254 to learn higher frequency image features. In some embodiments, the Fourier feature mapping module 252 can map three-dimensional positional coordinates to $R^{2L}$, where $2L>3$. In some embodiments, the fully-connected MLP network 254 can comprise eighteen fully-connected layers. Each of the fully-connected layers can be associated with a batch normalization layer and a rectified linear unit (ReLU) activation (not shown in FIG. 2B). In some embodiments, the fully-connected MLP network 254 can include two connections to concatenate an input to a fully connected layer at the sixth layer's activation and a twelfth layer's activation, respectively. Such an implementation may aid in optimizing the fully-connected MLP network 254. In some embodiments, first, seventh, and thirteenth fully-connected layers of the fully-connected MLP network 254 can have 2L, 2L+256, 2L+256 neurons, respectively. Other fully-connected layers the fully-connected MLP network 254 can have 256 neurons. Once trained, the fully-connected multi-layer perceptron (MLP) network 254 can output an intensity value 256 of a voxel for each positional coordinate 258.

FIG. 3A illustrates a table 300 showing details of magnetic resonance (MR) scans used to evaluate performance of an implicit representation model, according to various embodiments of the present disclosure. The table 300 shows three datasets of MR scans: a dataset #A, a dataset #B, and a dataset #C. The dataset #A comprises high-resolution MR scans of brains of five adults captured from a magnetic resonance scanner (i.e., a 7T MR scanner). The dataset #B comprises high-resolution MR scans of brains of two patients suffering from lesions in white matter. The dataset #C comprises four MR scans of the brains of the two patients, of which one high-resolution MR scan is used as a reference for the other three low-resolution MR scans in coronal, axial, and sagittal orientations of the brain. In general, an MR scan can comprise a plurality of MR images (i.e., image slices).

For dataset #A and dataset #B, the high-resolution MR scans are down-sampled by a factor of 4 and 8, respectively, in three orthogonal dimensions (e.g., coronal, axial, and sagittal) to generate low-resolution MR scans. These low-resolution MR scans are then used to train a machine learning model (e.g., the machine learning model 210 of FIG. 2A and the machine learning model 250 of FIG. 2B). The original high-resolution MR scans of the dataset #A and the dataset #B are then compared with high-resolution images generated through the machine learning model. For dataset #C, the low-resolution MR scans are directly used the train the machine learning model. The high-resolution images of the dataset #C are then compared with high-resolution images generated through the implicit representation model.

For comparison, in addition to training the machine learning model, two other machine learning models—super-resolution reconstruction (SRR) and B-Spline interpolation—that are widely used today to generate high-resolution MR images are trained using the same MR images from the three datasets. High-resolution images generated by these three techniques are qualitatively evaluated in FIG. 3B. High-resolution images generated by these three techniques are quantitatively evaluated in terms of peak signal-to-noise ratio (PSNR) and structural similarity (SSIM) in FIG. 3C.

Figure 3B:
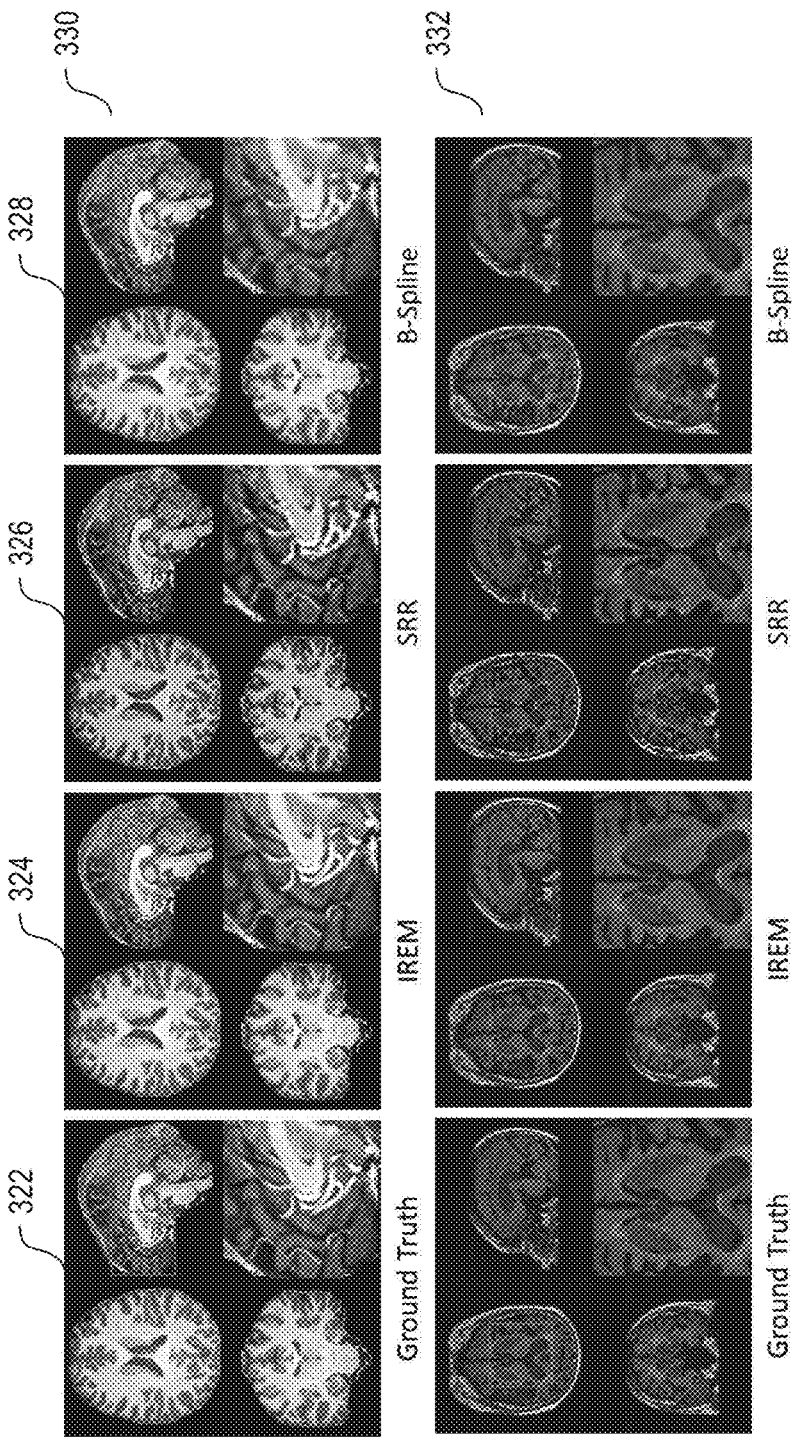
FIG. 3B illustrates high-resolution images 320 generated through a machine learning model, a super-resolution reconstruction, and a B-Spline interpolation, according to various embodiments of the present disclosure.

FIG. 3B illustrates high-resolution images 320 generated through the machine learning model, the super-resolution reconstruction, and the B-Spline interpolation, according to various embodiments of the present disclosure. The high-resolution images 320 are generated after the machine learning model, the super-resolution reconstruction, and the B-Spline interpolation are trained with the down-sampled low-resolution images from the dataset #A and dataset #B. As shown in FIG. 3B, the high-resolution images 320 includes 4 columns of images. A first column of images 322 corresponds to reference images (e.g., Ground Truth) to which high-resolution images generated by the implicit representation model, the super-resolution reconstruction, and the B-Spline interpolation are compared. A second column of images 324 corresponds to high-resolution images generated by the machine learning model (e.g., IREM). A third column of images 326 corresponds to high-resolution images generated by the super-resolution reconstruction (e.g., SRR). A fourth column of images 328 corresponds to high-resolution images generated by the B-Spline interpolation (e.g., B-Spline). Also shown in FIG. 3B, the high-resolution images 320 includes a top row of images 330 and a bottom row of images 332. The top row of images 330 is generated (i.e., reconstructed) based on the low-resolution MR images of the dataset #A by the implicit representation model, the super-resolution reconstruction, and the B-Spline interpolation, respectively. The bottom row of image 332 is generated based on the low-resolution MR images of the dataset #B by the implicit representation model, the super-resolution reconstruction, and the B-Spline interpolation, respectively.

As can be seen from FIG. 3B, high-resolution images from the second column of images 324 are of better quality than high-resolution images from the third column of images 326 and the fourth column of images 328. As can be seen from FIG. 3B, in general, high-resolution images generated through the machine learning model (i.e., the second column of images 324) offer higher contrast, higher resolution, and sharper edges than high-resolution images generated through the super-resolution reconstruction and the B-Spline interpolation (i.e., the third column of images 326 and the fourth column of images 328). Furthermore, as can be seen from FIG. 3B, high-resolution images generated through the machine learning model have comparable quality to the reference images (i.e., the first column of images 324). As such, the disclosure provided herein improves over conventional techniques of reconstructing high-resolution images from a set of low-resolution images.

Figure 3C:
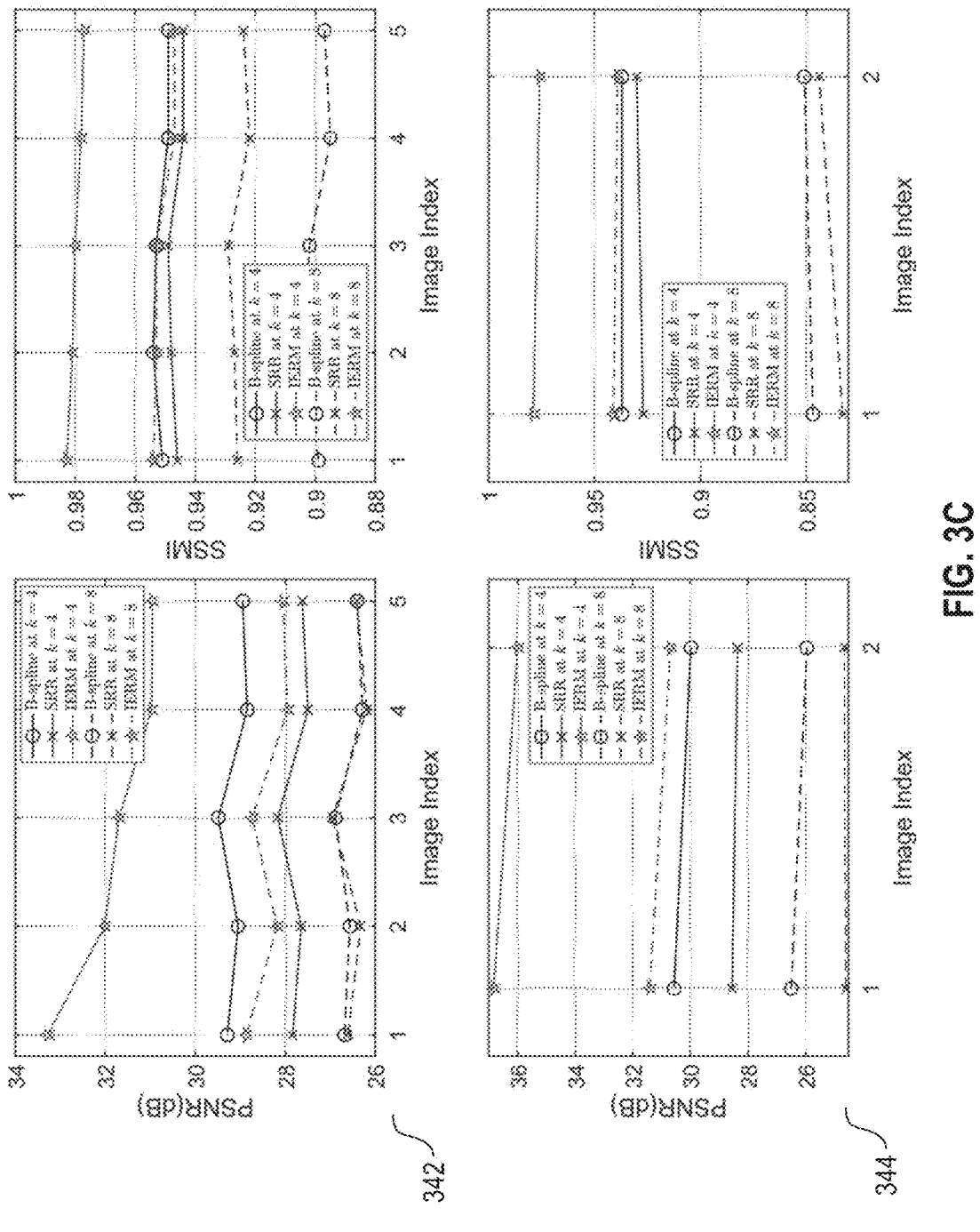
FIG. 3C illustrates plots showing quantitative comparisons of high-resolution images generated through a machine learning model, a super-resolution reconstruction, and a B-Spline interpolation, according to various embodiments of the present disclosure.

FIG. 3C illustrates plots 340 showing quantitative comparisons of high-resolution images generated through the implicit representation model, the super-resolution reconstruction, and the B-Spline interpolation, according to various embodiments of the present disclosure. As shown in FIG. 3C, there can be two sets of plots. A first set of plots 342 includes a peak signal-to-noise ratio (PSNR) to image index plot and a structural similarity (SSIM) to image index plot of high-resolution images generated through the implicit representation model, the super-resolution reconstruction, and the B-Spline interpolation based on low-resolution images of the dataset #A. A second set of plots 344 includes two peak signal-to-noise ratio (PSNR) to image index plots of high-resolution images generated through the implicit representation model, the super-resolution reconstruction, and the B-Spline interpolation based on low-resolution images of the dataset #B. As can be seen from FIG. 3C, in both sets of plots, high-resolution images generated through the machine learning model offer better PSNR and SSIM performances than high-resolution images generated through the super-resolution reconstruction and the B-Spline interpolation. As such, the disclosure provided herein improves over conventional techniques of reconstructing high-resolution images from a set of low-resolution images.

Figure 3D:
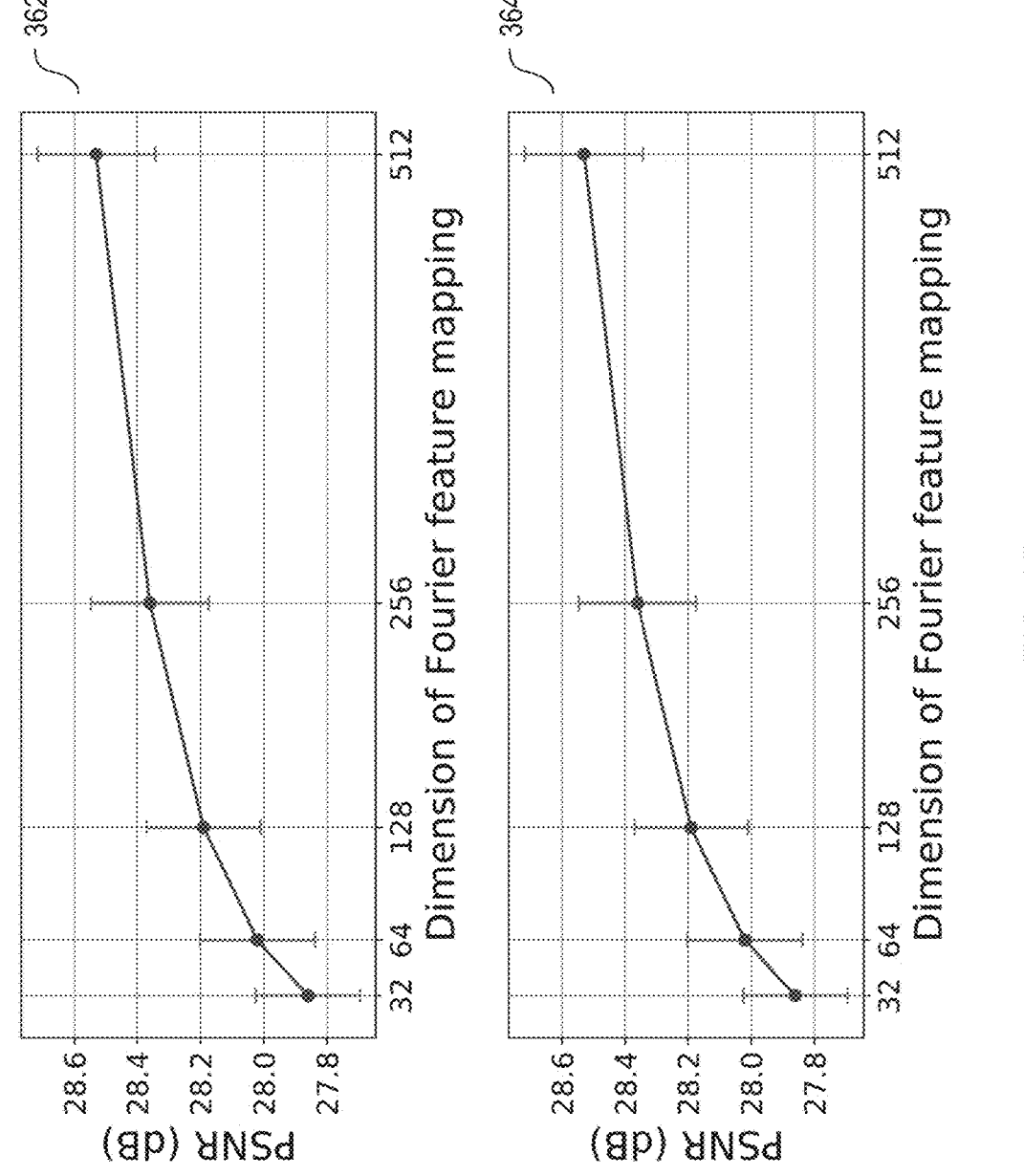
FIG. 3D illustrates plots showing improvements in peak signal-to-noise ratio and structural similarity performances due to up-sampling of positional coordinates of voxels using a Fourier feature mapping, according to various embodiments of the present disclosure.

FIG. 3D illustrates plots 360 showing improvements in peak signal-to-noise ratio and structural similarity performances due to up-sampling of positional coordinates of voxels using a Fourier feature mapping, according to various embodiments of the present disclosure. FIG. 3D shows a first plot 362 and a second plot 364. The first plot 362 is a peak signal-to-noise ratio (PSNR) to positional coordinate (i.e., Dimension of Fourier feature mapping) plot and the second plot 364 is a structural similarity (SSIM) to positional coordinate (i.e., Dimension of Fourier feature mapping) plot. As can be seen from the first plot 362 and the second plot 364, PSNR and SSIM performances of images increase as dimensions of positional coordinates of voxels of images used to train (e.g., encode) an machine learning model (e.g., the machine learning model 210 of FIG. 2A and the machine learning model 250 of FIG. 2B) increases. As such, the disclosure provided herein improves over conventional techniques of reconstructing high-resolution images from a set of low-resolution images.

FIG. 4 illustrates a computing component 400 that includes one or more hardware processors 402 and a machine-readable storage media 404 storing a set of machine-readable/machine-executable instructions that, when executed, cause the hardware processor(s) 402 to perform a method, according to various embodiments of the present disclosure. The computing component 400 may be, for example, the computing system 500 of FIG. 5. The hardware processors 402 may include, for example, the processor(s) 504 of FIG. 5 or any other processing unit described herein. The machine-readable storage media 404 may include the main memory 506, the read-only memory (ROM) 508, the storage 510 of FIG. 5, and/or any other suitable machine-readable storage media described herein.

At block 406, the processor 402 can obtain a plurality of images from a plurality of image scanning orientations. The plurality of images can be arranged in image slices in orthogonal orientations, and the orthogonal orientations can include at least one of a coronal orientation, an axial orientation, or a sagittal orientation. The plurality of images can be at least magnetic resonance images, computed tomography scan images, optical images, or electron scanning microscope images.

At block 408, the processor 402 can perform a rigid registration to the plurality of images to obtain a transformation matrix to normalize the plurality of images from their respective image spaces to a normalized image space. Each normalized image can comprise a plurality of voxels. The transformation matrix can comprise at least one of a transformation matrix for the coronal orientation, a transformation matrix for the axial orientation, or a transformation matrix for the sagittal orientation. The transformation matrix with which to transforms the plurality of images from their respective image spaces to the normalized image space can be selected from at least one of the transformation matrix for the coronal orientation, the transformation matrix for the axial orientation, or the transformation matrix for the sagittal orientation based on the image slices.

At block 410, the processor 402 can train a machine learning model comprising an implicit representation of a high-resolution image using the normalized images. The high-resolution image comprises more voxels than the voxels in the normalized images. The machine learning model can be a fully connected multi-layer perceptron (MLP) network. The fully connected MLP network can comprise eighteen fully-connected layers. First, seventh, and thirteenth layers of the fully-connected MLP network can have a number of neurons that is different from other layers of the fully-connected MLP network. The other layers of the fully-connected MLP network can have at least 256 neurons per layer.

At block 412, the processor 402 can generate a high-resolution image based on the machine learning model. The machine learning model can be inputted with positional coordinates of voxels of the high-resolution image. A dense grid of the normalized image space can be generated. The dense grid can be represented by voxels and each voxel can be represented by a positional coordinate in the normalized image space. The positional coordinates of voxels of the high-resolution image can be inputted into the machine learning model. Intensity values from the machine learning model can be received based on the positional coordinates of voxels of the high-resolution image. The high-resolution image can be generated based on the intensity values.

The techniques described herein, for example, are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination.

Figure 5:
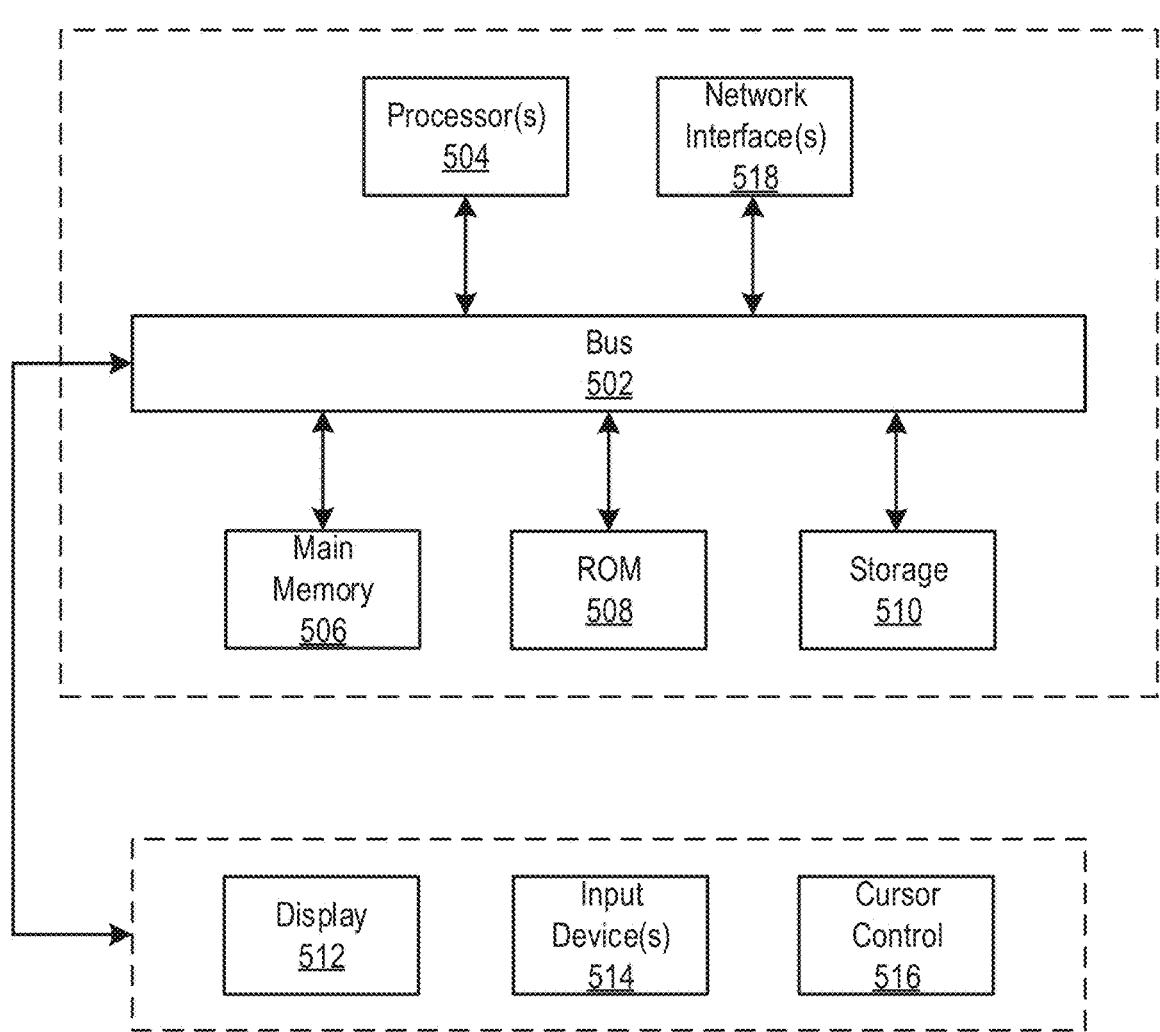
FIG. 5 is a block diagram that illustrates a computer system upon which any of various embodiments described herein may be implemented.

FIG. 5 is a block diagram that illustrates a computer system 500 upon which any of various embodiments described herein may be implemented. The computer system 500 includes a bus 502 or other communication mechanism for communicating information, one or more hardware processors 504 coupled with bus 502 for processing information. A description that a device performs a task is intended to mean that one or more of the hardware processor(s) 504 performs.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to output device(s) 512, such as a cathode ray tube (CRT) or LCD display (or touch screen), for displaying information to a computer user. Input device(s) 514, including alphanumeric and other keys, are coupled to bus 502 for communicating information and command selections to processor 504. Another type of user input device is cursor control 516. The computer system 500 also includes a communication interface 518 coupled to bus 502.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiment.

A component being implemented as another component may be construed as the component being operated in a same or similar manner as the another component, and/or comprising same or similar features, characteristics, and parameters as the another component.

What is claimed is:

1. A computer-implemented method comprising:
  obtaining a plurality of images from a plurality of image scanning orientations;

performing a rigid registration to the plurality of images to obtain a transformation matrix to normalize the plurality of images from respective image spaces of the plurality of images to a normalized image space, and to obtain normalized images, wherein each normalized image comprises a plurality of voxels;

training a machine learning model comprising an implicit representation of a high-resolution image using the normalized images to obtain a trained machine learning model, wherein the high-resolution image comprises more voxels than the voxels in the normalized images; and generating the high-resolution image based on the trained machine learning model;

wherein generating the high-resolution image based on the trained machine learning model comprises:

generating a dense grid of the normalized image space, wherein the dense grid is represented by voxels and each voxel is represented by a positional coordinate in the normalized image space;

inputting positional coordinates of voxels of the high-resolution image into an implicit representation model;

receiving intensity values from the implicit representation model of the trained machine learning model based on the positional coordinates of the voxels of the high-resolution image; and generating the high-resolution image based on the intensity values.

2. The computer-implemented method of claim 1, further comprising:

performing Fourier feature mapping by mapping positional coordinates of the voxels to a higher dimensional space.

3. The computer-implemented method of claim 1, wherein the plurality of images are arranged in image slices in orthogonal orientations, and wherein the orthogonal orientations include at least one of a coronal orientation, an axial orientation, or a sagittal orientation.

4. The computer-implemented method of claim 1, wherein the plurality of images are a plurality of anisotropic 2D images, and the high-resolution image is a 2D high-resolution image.

5. The computer-implemented method of claim 1, wherein the plurality of images are a plurality of anisotropic 2D images, and the high-resolution image is a 3D high-resolution image.

6. The computer-implemented method of claim 1, wherein the machine learning model is optimized by minimizing errors between intensity values outputted by the machine learning model and intensity values of the normalized images.

7. The computer-implemented method of claim 1, wherein each image is selected from a group consisting of a magnetic resonance image, a computed tomography scan image, an optical image, and an electron scanning microscope image.

8. The computer-implemented method of claim 1, wherein the machine learning model is a fully connected multi-layer perceptron (MLP) network.

9. A computer-implemented method comprising:

obtaining a plurality of images from a plurality of image scanning orientations;

performing a rigid registration to the plurality of images to obtain a transformation matrix to normalize the plurality of images from respective image spaces of the plurality of images to a normalized image space, and to obtain normalized images, wherein each normalized image comprises a plurality of voxels;

training a machine learning model comprising an implicit representation of a high-resolution image using the normalized images to obtain a trained machine learning model, wherein the high-resolution image comprises more voxels than the voxels in the normalized images; and generating the high-resolution image based on the trained machine learning model;

wherein the machine learning model is a fully connected multi-layer perceptron (MLP) network; and wherein the fully connected MLP network comprises eighteen fully-connected layers, wherein a number of neurons of first, seventh, and thirteenth fully-connected layers of the fully-connected MLP network is different from a number of neurons of other fully-connected layers of the fully-connected MLP network, and wherein the other fully-connected layers of the fully-connected MLP network have at least 256 neurons per layer.

10. A non-transitory storage medium of a computing system storing instructions, wherein when the instructions are executed by one or more processors of the computing system, the computing system performs a method comprising:

obtaining a plurality of images from a plurality of image scanning orientations;

performing a rigid registration to the plurality of images to obtain a transformation matrix to normalize the plurality of images from respective image spaces of the plurality of images to a normalized image space, and to obtain normalized images, wherein each normalized image comprises a plurality of voxels;

training a machine learning model comprising an implicit representation of a high-resolution image using the normalized images to obtain a trained machine learning model, wherein the high-resolution image comprises more voxels than the voxels in the normalized images; and generating the high-resolution image based on the trained machine learning model;

wherein generating the high-resolution image based on the trained machine learning model comprises:

generating a dense grid of the normalized image space, wherein the dense grid is represented by voxels and each voxel is represented by a positional coordinate in the normalized image space; inputting positional coordinates of voxels of the high-resolution image into an implicit representation model;

receiving intensity values from the implicit representation model of the trained machine learning model based on the positional coordinates of the voxels of the high-resolution image; and generating the high-resolution image based on the intensity values.

11. The non-transitory storage medium of claim 10, wherein the method further comprises:

performing Fourier feature mapping by mapping positional coordinates of the voxels to a higher dimensional space.

12. The non-transitory storage medium of claim 10, wherein the plurality of images are arranged in image slices in orthogonal orientations, and wherein the orthogonal orientations include at least one of a coronal orientation, an axial orientation, or a sagittal orientation.

13. The non-transitory storage medium of claim 10, wherein the plurality of images are a plurality of anisotropic 2D images, and the high-resolution image is a 2D high-resolution image.

14. The non-transitory storage medium of claim 10, wherein the plurality of images are a plurality of anisotropic 2D images, and the high-resolution image is a 3D high-resolution image.

15. The non-transitory storage medium of claim 10, wherein the machine learning model is optimized by minimizing errors between intensity values outputted by the machine learning model and intensity values of the normalized images.

16. The non-transitory storage medium of claim 10, wherein each image is selected from a group consisting of a magnetic resonance image, a computed tomography scan image, an optical image, and an electron scanning microscope image.

17. The non-transitory storage medium of claim 10, wherein the machine learning model is a fully connected multi-layer perceptron (MLP) network.

18. The non-transitory storage medium of claim 17, wherein the fully connected MLP network comprises eighteen fully-connected layers, wherein a number of neurons of first, seventh, and thirteenth fully-connected layers of the fully-connected MLP network is different from a number of neurons of other fully-connected layers of the fully-connected MLP network, and wherein the other fully-connected layers of the fully-connected MLP network have at least 256 neurons per layer.

\* \* \* \* \*